June 12, 1962 T. W. SMITH 3,038,507
METERING DEVICE FOR PLASTIC MATERIAL
Filed May 19, 1958 3 Sheets-Sheet 1
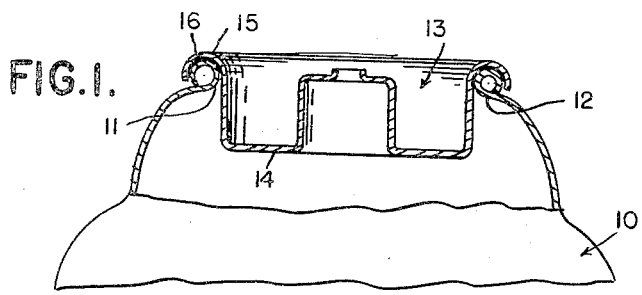
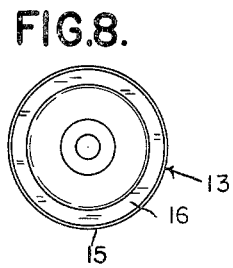
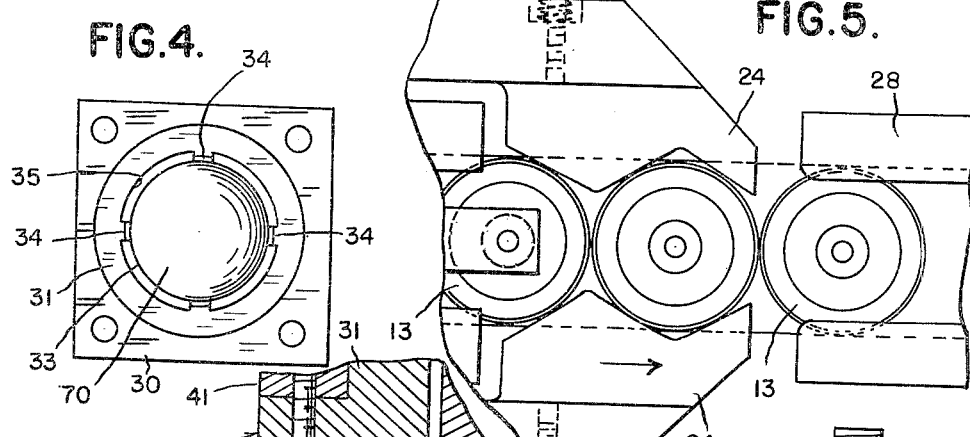
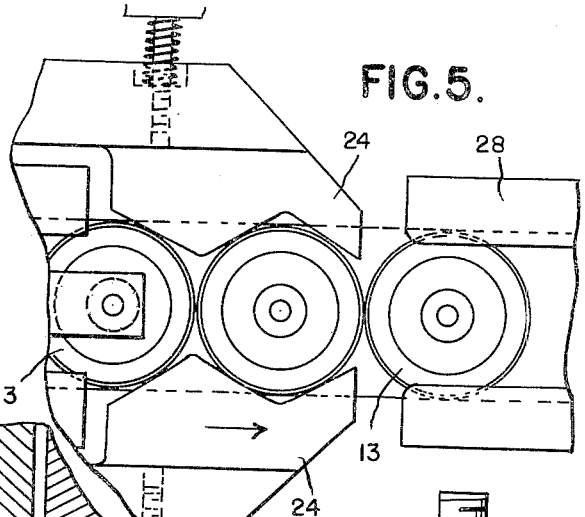
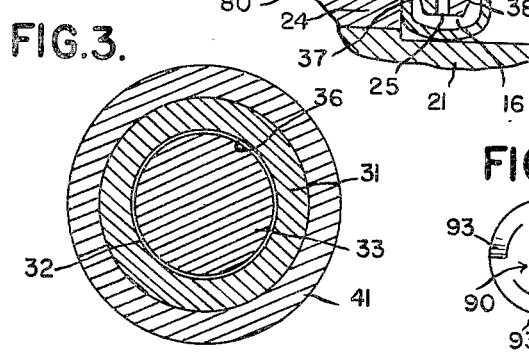
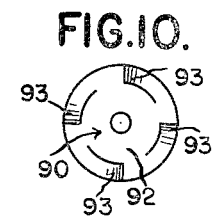
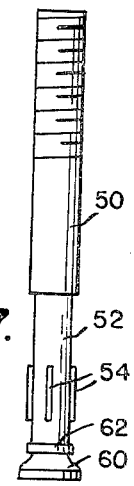
INVENTOR.
THOMAS W. SMITH
BY
ATTORNEYS

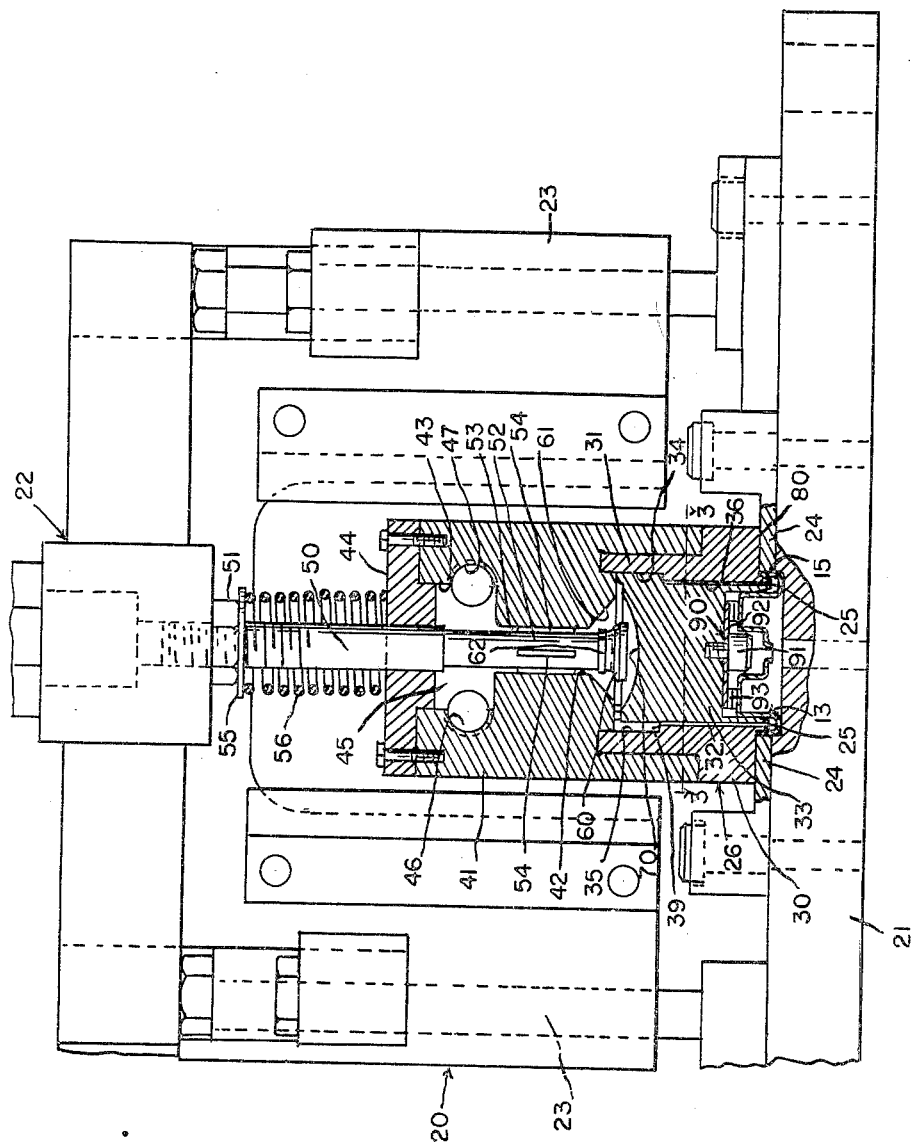

INVENTOR.
THOMAS W. SMITH

United States Patent Office 3,038,507
Patented June 12, 1962

3,038,507
METERING DEVICE FOR PLASTIC MATERIAL
Thomas W. Smith, Clawson, Mich., assignor to Watts Electric & Mfg. Co., Birmingham, Mich., a corporation of Michigan
Filed May 19, 1958, Ser. No. 736,068
10 Claims. (Cl. 141—117)

This invention relates generally to a metering device for plastic material, and refers more particularly to a device for depositing plastic material in a fluid state onto separate elements or structures delivered successively thereto.

One of the essential objects of the invention is to provide a device of the type mentioned having means for accurately metering the plastic material deposited.

Another object is to provide a device having means for depositing a metered quantity of plastic material uniformly and simultaneously throughout an annular recess in a separate element.

Another object is to provide a device having means for automatically terminating the discharge of plastic material when a metered quantity thereof has been discharged.

Another object is to provide an efficient method and apparatus, as hereinafter set forth, for accomplishing the objects aforesaid.

Other objects, advantages and novel details of construction of this invention will be made more apparent as this description proceeds, especially when considered in connection with the accompanying drawings wherein:

FIGURE 1 is a fragmentary elevational view of a pressure container and a cap therefor, with parts broken away and in section.

FIGURE 2 is a fragmentary elevational view of a portion of my apparatus, with parts broken away and in section, and showing the nozzle for the plastic material in lowered position to discharge plastic fluid into an open return-bent flange of a cap.

FIGURE 3 is a cross sectional view taken substantially on the line 3—3 of FIGURE 2.

FIGURE 4 is a top plan view of the core and supporting base member of the nozzle.

FIGURE 5 is a fragmentary top plan view of the clamping jaws and discharge chute for the caps.

FIGURE 6 is an enlarged fragmentary vertical sectional view through the discharge end of the nozzle, and through a cap, a clamping jaw for said cap, and through the bed of the press.

FIGURE 7 is an elevational view of the rod, valve, ring and fins.

FIGURE 8 is a top plan view of a cap containing a metered charge of plastic material.

FIGURE 10 is a top plan view of the disc spring.

Figure 9:
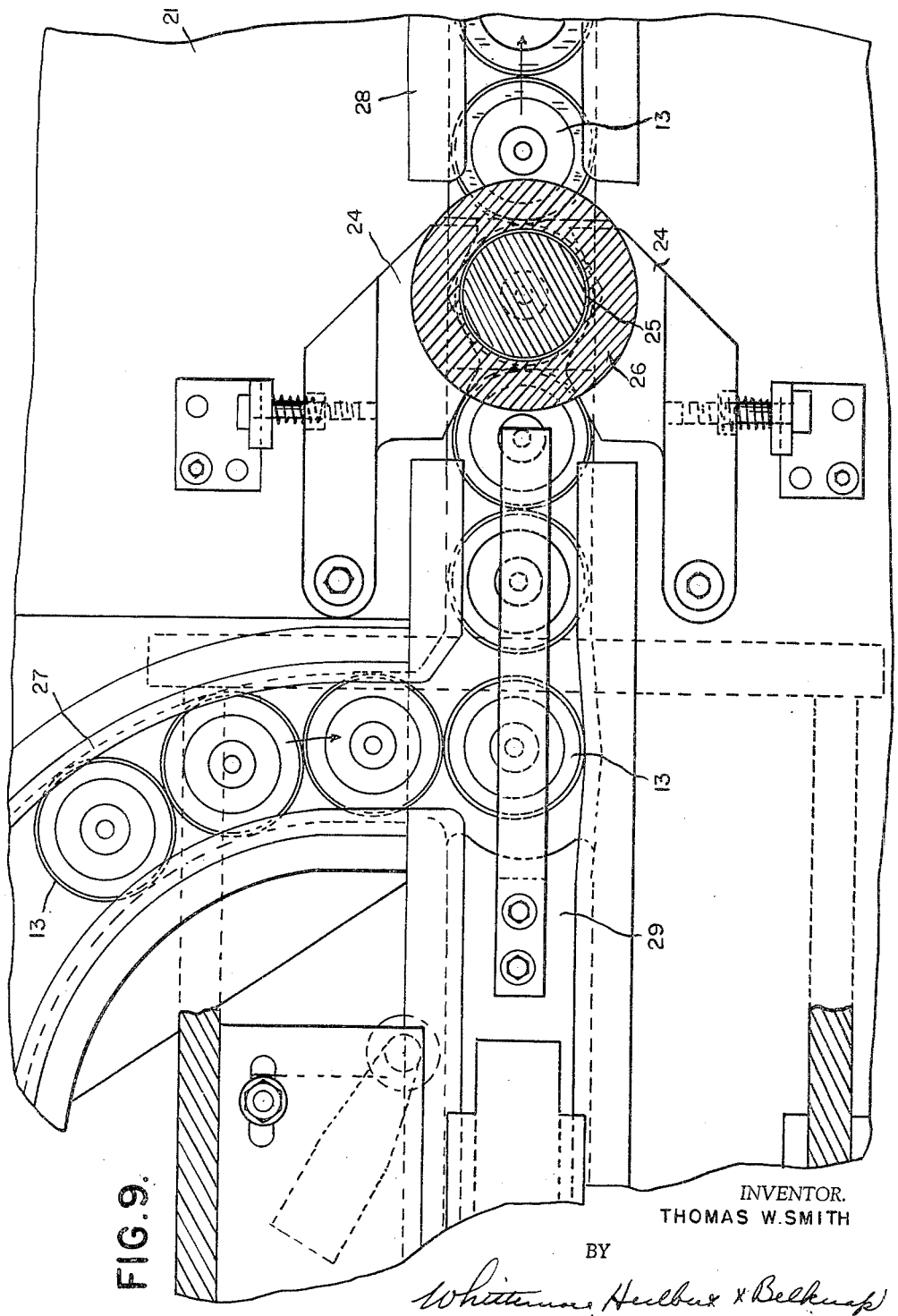
FIGURE 9 is a horizontal sectional view through the nozzle, and showing a fragmentary plan view of the feed chute, discharge chute, caps in said chutes, plunger, pivotally mounted jaws, bed and associated parts.

In the drawings, 10 is a pressurized container having an opening 11 at its upper end which is surrounded by a rounded bead 12. 13 is the closure cap formed of pressed sheet metal and having a cupped portion 14 extending downward within the opening 11 and having an annular open return-bent flange 15 for fitting upon the bead 12.

To form a sealing joint between the cap 13 and container 10, plastic material in a fluid state is deposited within the annular open return-bent flange 15 of the cap 13 to form a resilient sealing gasket 16. Various plastic materials may be used for this purpose, but one which is very satisfactory is polyvinyl chloride.

20 is a press having a bed 21, a vertically movable cross arm 22 of a ram, and upwardly extending guide columns 23. 24 are pivotally mounted jaws on the bed 21 for holding a cap 13 in registration with an annular outlet 25 of a nozzle 26 for the fluid plastic. Such cap 13 is disposed in inverted position with the annular open return-bent flange 15 opening upwardly to receive the fluid plastic from the annular outlet 25 of the nozzle 26.

The caps 13 are successively fed into engagement with the jaws 24 from a feed chute 27, and are successively received from the jaws 24 by a discharge chute 28 leading to an endless conveyor (not shown). A plunger 29 is utilized for advancing the caps 13 from the feed chute 27 to the jaws 24, and thence to the discharge chute 28.

The nozzle 26 for delivering the fluid plastic comprises a base member 30 having an upstanding annular portion 31 provided with a cylindrical bore 32 therein, and a cylindrical core 33 of slightly smaller diameter extending within said bore 32 and held concentric therewith by a plurality of circumferentially spaced lugs 34 projecting radially from the core at its upper end and engaging a counterbore 35 in the annular portion 31. Thus the annular portion 31 and core 33 form an annular passage 36 of restricted width extending from the counterbore 35 to the annular outlet 25 at the lower end of the nozzle 26, and the side walls of the counterbore 35 and the adjacent side walls of the core 33 provide an annular space or passage that receives the radially projecting lugs 34 and that extends from the annular passage 36 to the space between the upper end of the core 33 and an upper head member 41. Preferably the annular portion 31 and the core 33 have downwardly tapering portions 37 and 38 respectively to enable the lower end of the nozzle 26 to fit within the open return-bent flange 15 of a cap 13.

The lugs 34 rest on a shoulder 39 provided by the counterbore 35, hence the core 33 is supported or carried by the annular portion 31 of the base member 30. Such base member 30 may be secured by any suitable means such as the upwardly extending screws 40 to the upper head member 41 which at its lower end is recessed to receive the annular portion 31 of said base member.

Centrally within the head member 41 is an upwardly extending bore 42 having an enlarged counterbore 43 at its upper end closed by a gland nut 44 to form a chamber 45 for the fluid plastic. This chamber 45 has an inlet port 46 for receiving fluid plastic under pressure from a suitable source (not shown), and has an outlet port 47 through which fluid plastic may be discharged to suitable conduit means (not shown) leading to said source for re-circulating purposes.

A rod 50 threadedly engages the cross arm 22 of the ram and is held by a lock nut 51. This rod 50 extends downwardly through the gland nut 44 and through the chamber 45 and has a reduced portion 52 within and cooperating with the bore 42 to form an annular passage 53 therebetween. Vertically extending fins 54 are provided on the reduced portion 52 of the rod at circumferentially spaced points thereof and engage the bore 42 to guide the reduced portion 52 centrally of the bore 42. A washer 55 is sleeved on the rod 50 and engages the nut 51, while a coil spring 56 is sleeved on the rod 50 between the washer 55 and the gland nut 44. A substantially frusto conical valve 60 integral with the reduced portion 52 of the rod is engageable with a conical seat 61 at the lower outlet end of the bore 42 when the rod 50 is moved upwardly by the cross bar 22 of the ram and is adapted to cut off communication between the bore 42 and the nozzle 26. There is also an integral ring 62 on the reduced portion 52 of the rod just above the valve 60 to closely fit the bore 42 and act as a piston therein.

The upper end of the core 33 is centrally recessed to form a sump 70 for the fluid plastic, and such sump is directly below and in communication with the lower outlet end of the bore 42 and the space below the valve seat 61, and is in open communication with the annular space between the side walls of the counterbore 35 and the core 33 containing the radially projecting lugs 34. Such annular space constitutes an upward enlarged extension of the annular passage 36 and extends to and is adapted to receive fluid plastic from the periphery of the sump 70.

In use, the fluid plastic is fed under pressure from a suitable source (not shown) to the inlet 46 of the chamber 45 and is maintained at a predetermined pressure in said chamber.

When the rod 50 is moved downwardly by the cross arm 22 of the ram, the spring 56 will move the gland nut 44, head member 41, and nozzle 26 downwardly so that the annular outlet 25 of the nozzle will be moved into the annular open return-bent flange 15 of the registering cap 13 on the bed 21. The lower surface 80 of the base member 30 of the nozzle will then bear against the upper surfaces of the jaws 24. Also, when the rod 50 is moved downwardly, the valve 60 will be moved downwardly from its seat 61 and the ring 62 will be moved downwardly from the bore 42. Hence the fluid plastic will flow downward under pressure from the chamber 45 through the bore 42 into the sump 70 from which the fluid plastic will flow radially outward into the counterbore 35 and thence downwardly through the annular passage 36 to and outwardly from the annular outlet 25 of the nozzle into the annular return-bent flange 15 of the registering cap 13.

Upward movement of the rod 50 will move the ring 62 upwardly into the bore 42 to thereby close the same and to oppose downward flow of the fluid plastic through said bore. This upward movement of the rod 50 and ring 62 will create a suction which will withdraw upwardly into the sump 70 fluid plastic from the annular passage 36 of the nozzle. Thus such suction will terminate or cut off instantly the downward flow of the fluid plastic through the annular outlet 25 of the nozzle 26, and consequently the fluid plastic discharged from the annular outlet 25 of the nozzle 26 into the annular open return-bent flange 15 of the cap will be an exactly metered and uniform quantity.

The actual volume of the fluid plastic discharged from the nozzle 26 is controlled by the pressure in the chamber 45 and the size of the annular passage 36 to the annular opening between the valve seat 61 and the ring 62. Moreover, the fluid plastic will be discharged from the nozzle 26 throughout the annular outlet 25 thereof, and consequently the metered charge of such fluid plastic will be received uniformly and simultaneously throughout the annular return-bent flange 15 of the registering cap 13.

Upward movement of the rod 50 also causes the valve 60 to engage its seat 61 and lift the head member 41 and gland nut 44. Inasmuch as the base member 30 of the nozzle carries the core 33 and is secured to the head member 41, the base member 30 and core 33 will likewise be lifted to enable a successive cap 13 to be fed to the jaws 24 for subsequent registration with the annular outlet 25 of the nozzle 26.

To prevent the registering cap 13 supplied with fluid plastic as aforesaid from following the nozzle 26 upwardly, I have provided a spring member 90 on the underside of the base member 30. Preferably this spring member 90 is secured to the core 33 by an upwardly extending screw 91 and comprises a disc 92 having circumferentially spaced spring fingers 93 for engagement with the registering cap 13.

In the present instance, the jaws 24 open and close in timed relation to the upward and downward movements of the nozzle 26, and the plunger 29 is reciprocated in timed relation to the movement of said jaws. Any suitable means (not shown) may be employed for actuating the jaws 24 and the plunger 29, as desired. Likewise, any suitable means (not shown) may be employed to actuate the cross arm 22 of the ram.

What I claim as my invention is:

1. Apparatus for depositing plastic material in a fluid state into an upwardly opening recess of a separate element, comprising a vertically reciprocating nozzle having at its lower end an outlet for said material adapted during the downstroke of said nozzle to register with said recess, cooperating jaws operable during the downstroke of said nozzle to hold said separate element in a predetermined position to enable the outlet of said nozzle to register with said recess, means operable during the upstroke of said nozzle to move said separate element relative to said predetermined position, and means for preventing said separate element from following said nozzle during the upstroke thereof, including means anchored to said nozzle and engageable with said separate element during the downstroke of said nozzle.

2. Apparatus for depositing plastic material in a fluid state into an upwardly opening annular recess of a separate element, comprising a vertically reciprocating nozzle having at its lower end an annular outlet for said material adapted during the downstroke of said nozzle to register with said annular recess, cooperating horizontally movable jaws operable during the downstroke of said nozzle to hold said separate element in a predetermined position to enable the annular outlet of said nozzle to register with said annular recess, means operable during the upstroke of said nozzle to move said separate element relative to said predetermined position, and means for preventing said separate element from following said nozzle during the upstroke thereof, including spring means anchored to said nozzle within the confines of said annular outlet and engageable with said separate element during the downstroke of said nozzle.

3. Apparatus for depositing plastic material in a fluid state into an upwardly opening recess of a separate member; comprising a nozzle movable vertically between predetermined raised and lowered positions respectively, and having at its lower end an outlet for said material adapted when said nozzle is in said lowered position to register with said recess, means for holding said separate member in a predetermined position to enable the outlet of said nozzle to register with said recess, means for conveying said separate member to said holding means, means for receiving said separate member from said holding means, and means for moving said separate member from said conveying means to said holding means and thence to said receiving means.

4. Apparatus for depositing plastic material in a fluid state into an upwardly opening recess of a separate member; comprising a nozzle movable vertically between predetermined raised and lowered positions respectively, and having at its lower end an outlet for said material adapted when said nozzle is in said lowered position to register with said recess, cooperating jaws for holding said separate member in a predetermined position to enable the outlet of said nozzle to register with said recess, a feed chute for conveying said separate member to said cooperating jaws, a discharge chute for receiving said separate member from said cooperating jaws, and a plunger for moving said separate member from said feed chute to said cooperating jaws and thence to said discharge chute.

5. Apparatus for depositing plastic material in a fluid state into an upwardly opening recess of a separate member; comprising a nozzle movable vertically between predetermined raised and lowered positions respectively, said nozzle having an outlet and a sump, and having a passage extending from said sump to said outlet, said outlet being at the lower end of said nozzle and adapted to register with said recess when said nozzle is in lowered position, said sump being at the upper end of said nozzle, a head above and connected to said nozzle to move therewith, said head having at vertically spaced points thereof a chamber and an outlet, and having a passage extending between said chamber and the outlet in said head, said chamber having an inlet port for said material under pressure, the outlet in said head being directly above and opening toward said sump whereby said material under pressure may be supplied from said chamber to said sump via the passage and outlet in said head, means for regulating the quantity of said material discharged from the outlet in said nozzle when in registration with said recess, including an element movable in opposite directions within the passage in said head and having means for closing the outlet in said head, said closing means being operable during movement of said element in one direction to open the outlet in said head and thereby permit said material under pressure to be supplied from said chamber via said sump to the passage in said nozzle, and operable during movement of said element in the opposite direction to close the outlet in said head and to create suction to withdraw residual material from the passage in said nozzle into said sump and thereby terminate automatically the discharge of said material from the outlet of said nozzle, yieldable means operable to move said head and nozzle as a unit to lowered position relative to said separate member to position the outlet of said nozzle in registration with said recess, and a part of said element being engageable with said head to move said head and nozzle as a unit to raised position relative to said separate member.

6. Apparatus for depositing plastic material in a fluid state onto a separate element; comprising a head mounted to move vertically in opposite directions and having a passage for the plastic material aforesaid, said passage being adapted to receive such plastic material under pressure from a suitable source and being provided with an outlet, a nozzle below and connected to said head to move therewith, said nozzle having a sump in communication with said outlet and having a passage in communication with said sump, the passage in said nozzle being provided with an outlet through which said plastic material may be discharged onto said separate element, means for regulating the quantity of plastic material supplied from the outlet in said head via said sump to the passage in said nozzle, including an element movable in opposite directions within the passage in said head and having means for closing the outlet in said head, said closing means being operable during movement of said element in one direction to open the outlet in said head and thereby permit said plastic material to be supplied from the passage in said head via said sump and the passage in said nozzle to the outlet of the latter, and operable during movement of said element in the opposite direction to close the outlet in said head and to create suction to withdraw residual plastic material from the passage in said nozzle into said sump to thereby terminate automatically the discharge of said plastic material from the outlet of said nozzle, and a pair of cooperating jaws movable horizontally beneath said nozzle during the downstroke of said head and nozzle to hold said separate element in a predetermined position substantially in vertical alignment with the outlet of said nozzle and engageable by said nozzle during the discharge of the plastic material from the outlet thereof.

7. The apparatus described in claim 6 wherein the jaws are movable away from each other during the upstroke of said head and nozzle.

8. Apparatus for depositing plastic material in a fluid state onto a separate element; comprising a head mounted to move vertically in opposite directions and having a passage for the plastic material aforesaid, said passage being adapted to receive such plastic material under pressure from a suitable source and being provided with an outlet, a nozzle below and connected to said head to move therewith, said nozzle having a sump in communication with said outlet and having a passage in communication with said sump, the passage in said nozzle being provided with an outlet through which said plastic material may be discharged onto said separate element, means for regulating the quantity of plastic material supplied from the outlet in said head via said sump to the passage in said nozzle, including an element movable in opposite directions within the passage in said head and having means for closing the outlet in said head, said closing means being operable during movement of said element in one direction to open the outlet in said head and thereby permit said plastic material to be supplied from the passage in said head via said sump and the passage in said nozzle to the outlet of the latter, and operable during movement of said element in the opposite direction to close the outlet in said head and to create suction to withdraw residual plastic material from the passage in said nozzle into said sump to thereby terminate automatically the discharge of said plastic material from the outlet of said nozzle, means provided to hold said separate element in a predetermined position relative to the outlet of said nozzle, means provided for conveying said separate element to said holding means, means provided for receiving said separate element from said holding means, and means provided to move said separate element from said holding means to said receiving means.

9. Apparatus for depositing plastic material in a fluid state onto a separate member; comprising a head mounted to move vertically in opposite directions and having a passage for the plastic material aforesaid, said passage being adapted to receive such plastic material under pressure from a suitable source and being provided with an outlet, a nozzle below and connected to said head to move therewith, said nozzle comprising a base member provided with a cylindrical bore and a cylindrical solid core member, said base member surrounding said core and being outwardly spaced therefrom to define with said core an annular restricted passage which terminates in an annular outlet for said material at the lower end of said core member, the upper end of said core member being provided with a recess to form a sump which is in open communication with the aforesaid annular restricted passage, means for regulating the quantity of plastic material supplied from the outlet in said head via said sump to the annular restricted passage in said nozzle, including an element movable in opposite directions within the passage in said head and having means for closing the outlet in said head, said closing means being operable during movement of said element in one direction to open the outlet in said head and thereby permit said plastic material to be supplied from the passage in said head via said sump and the annular restricted passage in said nozzle to the outlet of the latter, and operable during movement of said element in the opposite direction to close the outlet in said head and to create suction to withdraw residual plasic material from the annular restricted passage in said nozzle into said sump to thereby terminate automatically the discharge of said plastic material from the outlet of said nozzle, yieldable means operable to move said head and nozzle as a unit to lowered position relative to said separate member to position the outlet of said nozzle in registration with said recess, and a part of said element engageable with said head to move said head and nozzle as a unit to raised position relative to said separate member.

10. Apparatus for depositing plastic material in a fluid state onto a separate member; comprising a head mounted to move vertically in opposite directions and having a passage for the plastic material aforesaid, said passage being adapted to receive such plastic material under pressure from a suitable source and being provided with an outlet, a nozzle below and connected to said head to move therewith, said nozzle comprising a base member provided with a cylindrical bore and a cylindrical solid core member, said base member surrounding said core and being outwardly spaced therefrom to define with said core an annular restricted passage which terminates in an annular outlet for said material at the lower end of said core member, the upper end of said core member being provided with a recess to form a sump which is in open communication with the aforesaid annular restricted passage, means for regulating the quantity of plastic material supplied from the outlet in said head via said sump to the annular restricted passage in said nozzle, including an element movable in opposite directions within the passage in said head and having means for closing the outlet in said head, said closing means being operable during movement of said element in one direction to open the outlet in said head and thereby permit said plastic material to be supplied from the passage in said head via said sump and the annular restricted passage in said nozzle to the outlet of the latter, and operable during movement of said element in the opposite direction to close the outlet in said head and to create suction to withdraw residual plastic material from the annular restricted passage in said nozzle into said sump to thereby terminate automatically the discharge of said plastic material from the outlet of said nozzle, cooperating jaws for holding said separate member in a predetermined position relative to the outlet of said nozzle, a feed chute for conveying said separate member to said cooperating jaws, a discharge chute for receiving said separate member from said cooperating jaws, and a plunger for moving said separate member from said feed chute to said cooperating jaws and thence to said discharge chute.

References Cited in the file of this patent

UNITED STATES PATENTS

| | | |
|---|---|---|
| 1,136,740 | Tyson | Apr. 20, 1915 |
| 1,440,669 | Freedman | Jan. 2, 1923 |
| 1,926,343 | Lucke et al. | Sept. 12, 1933 |
| 2,096,499 | Mandell | Oct. 19, 1937 |
| 2,413,916 | Hallead | Jan. 7, 1947 |
| 2,492,873 | Lamb | Dec. 27, 1949 |
| 2,645,401 | Kerr | July 14, 1953 |
| 2,721,008 | Morgan | Oct. 18, 1955 |
| 2,839,226 | Ross | June 17, 1958 |
| 2,905,363 | Newey et al. | Sept. 22, 1959 |